United States Patent [19]

Thissen

[11] 4,083,746

[45] Apr. 11, 1978

[54] APPARATUS FOR MAKING BIOLOGICAL DISCS

[75] Inventor: Christopher P. Thissen, Austin, Minn.

[73] Assignee: Geo. A. Hormel & Co., Austin, Minn.

[21] Appl. No.: 754,094

[22] Filed: Dec. 23, 1976

[51] Int. Cl.² .................. B32B 31/14; B32B 31/20; B32B 31/26

[52] U.S. Cl. .................... 156/499; 156/250; 156/285; 156/382; 156/516; 264/92; 264/101; 425/292; 425/384; 425/388; 425/405 R; 425/DIG. 48; 425/DIG. 60

[58] Field of Search ............... 156/250, 285, 304, 306, 156/382, 499, 502, 507, 510, 513, 516, 523; 425/292, 383, 384, 388, 397, 405, DIG. 48, DIG. 60; 264/90, 92, 101

[56] References Cited

U.S. PATENT DOCUMENTS

| | | | |
|---|---|---|---|
| 2,387,566 | 10/1945 | Cüsters | 156/499 |
| 3,449,195 | 6/1969 | Girard | 156/502 |
| 3,586,583 | 6/1971 | Ospelt | 156/499 |
| 3,713,765 | 1/1973 | Rise | 425/388 |
| 3,914,104 | 10/1975 | Dean et al. | 425/DIG. 48 |
| 4,017,349 | 4/1977 | DePriest et al. | 156/510 |

*Primary Examiner*—Caleb Weston
*Attorney, Agent, or Firm*—Williamson, Bains, Moore & Hansen

[57] ABSTRACT

A method and apparatus for making biological discs comprises the steps and means for welding the longitudinal edges of a pair of identical rectangular plastic sheets together to form a single large sheet. This single large sheet is conveyed to a heating and vacuum forming station where the sheet is heated and vacuum formed to have a plurality of convex cup-like projections formed in the surface thereof. The sheet is then moved to a cutting station where heating mechanisms form openings therein for accommodating an axle and a plurality of tie rods, and the sheet is cut in circular configuration by a cutting device shiftable on a radius of predetermined magnitude.

4 Claims, 7 Drawing Figures

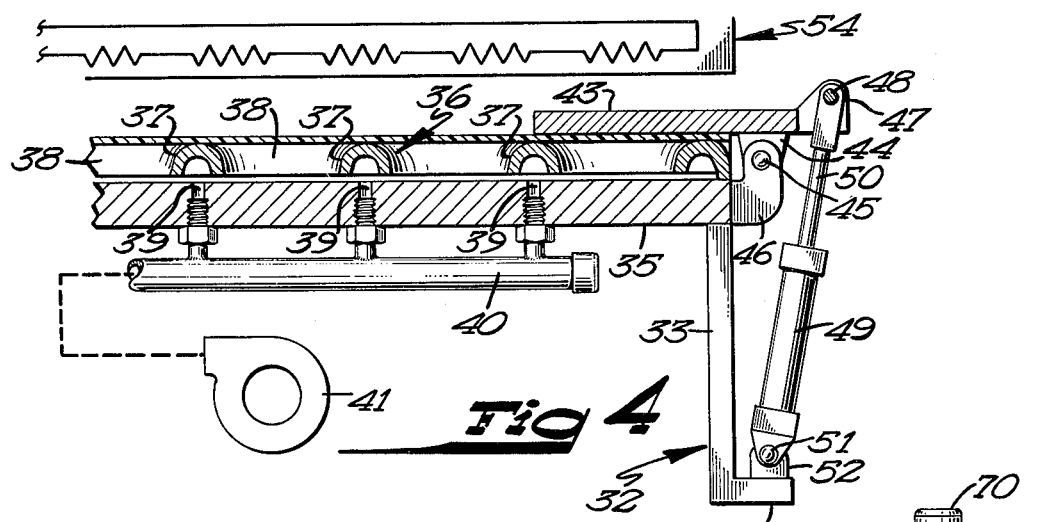
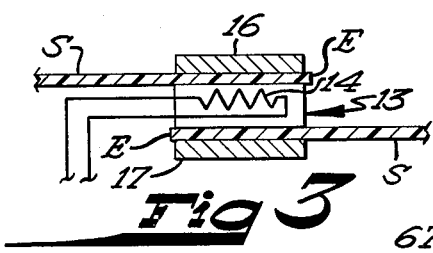
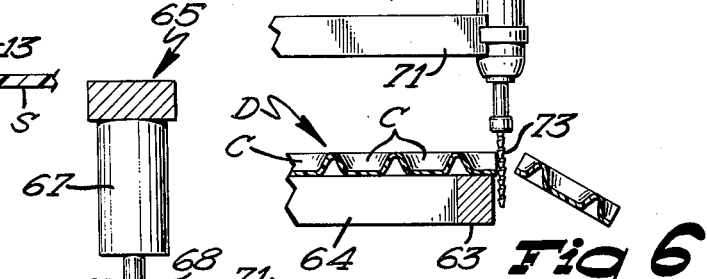
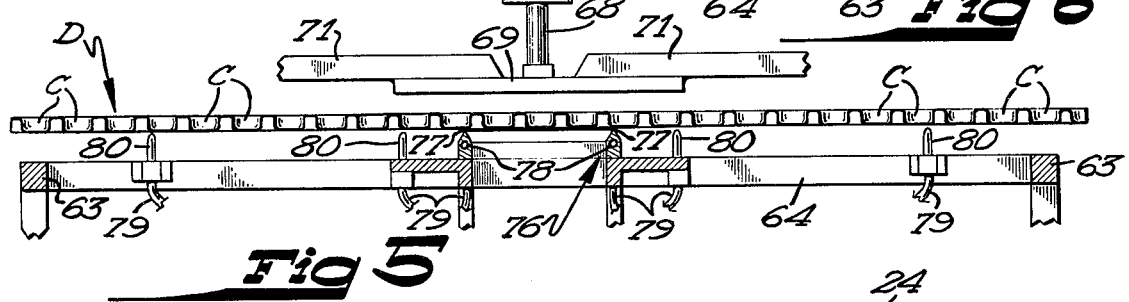
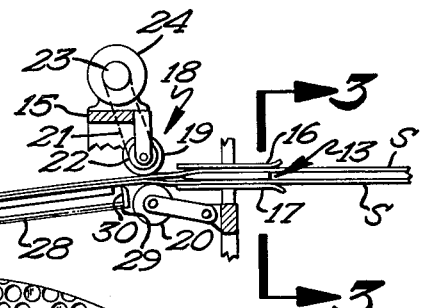

APPARATUS FOR MAKING BIOLOGICAL DISCS

SUMMARY OF THE INVENTION

This invention relates to an apparatus and method for making biological discs which are used in the treatment of waste water.

An object of this invention is to provide an apparatus and method for making large biological discs which are used in the treatment of waste water wherein these biological discs are vacuum formed and cut into circular configurations from a single sheet of plastic material.

A more specific object of this invention is to provide an apparatus and method of making a large biological disc wherein a pair of identical rectangular sheets of plastic material are welded together to form a single large sheet which is then vacuum formed to have a plurality of convex cup-like projections throughout the surface thereof, and which is then cut into circular configurations by a shiftable cutting device at a final cutting station.

These and other objects and advantages of this invention will more fully appear from the following description made in connection with the accompanying drawings, wherein like reference characters refer to the same or similar parts throughout the several views.

FIGURES OF THE DRAWING

FIG. 2 is a cross-sectional view taken approximately along Line 2—2 of FIG. 1 and looking in the direction of the arrows;

FIG. 3 is a cross-sectional view taken approximately along Line 3—3 of FIG. 2 and looking in the direction of the arrows;

FIG. 4 is a cross-sectional view taken approximately along Line 4—4 of FIG. 1 and looking in the direction of the arrows;

FIG. 5 is a cross-sectional view taken approximately along Line 5—5 of FIG. 1 and looking in the direction of the arrows;

FIG. 6 is a cross-sectional view taken approximately along Line 6—6 of FIG. 1 and looking in the direction of the arrows;

Figure 1:
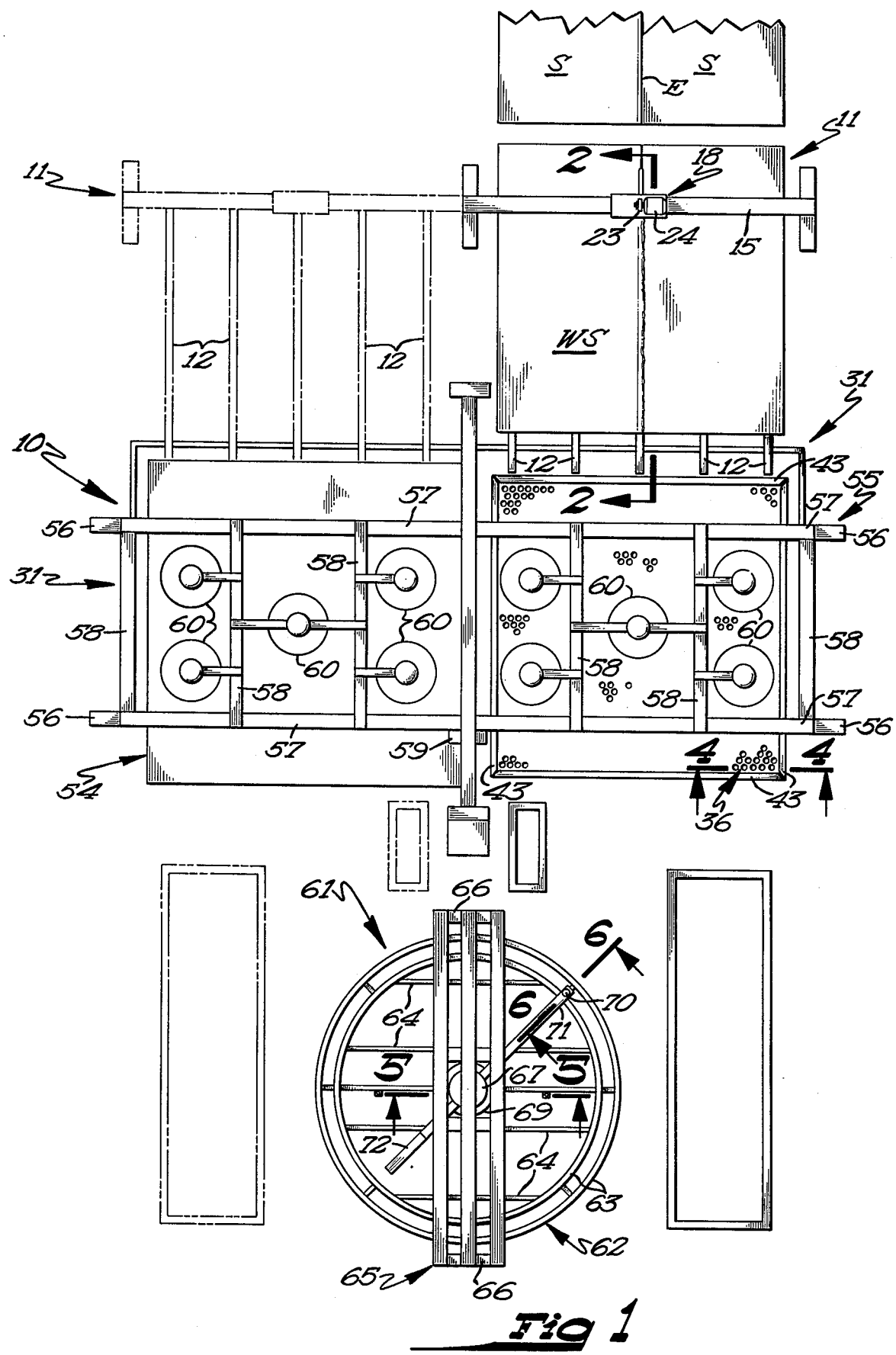
FIG. 1 is a diagrammatic top plan view of the novel apparatus used in carrying out the novel method.

and FIG. 7 is a plan view of a portion of a formed biological disc.

DESCRIPTION OF THE PREFERRED EMBODIMENT OF THE INVENTION

Referring now to the drawings and more specifically to FIG. 1, it will be seen that one embodiment of the apparatus, designated generally by the reference numeral 10, is thereshown. In carrying out the novel method, large biological discs D are formed from a single sheet of plastic material. Several discs D are mounted on an elongate axle, and the discs are partially submerged in waste water contained in a tank, and are revolved at a predetermined rate through the waste water so that biological organisms growing on the disc can rapidly digest the waste material in the water.

The biological discs are usually formed of a light weight inert plastic material such as polyethylene or polystyrene and are usually of relatively large size, some having a diameter of approximately 12 feet. The biological discs are formed from extruded sheets of plastic material although the present extruding equipment does not extrude sheets large enough to form the larger size discs. Therefore in carrying out the present method, two identical generally rectangular shaped sheets of plastic material are welded together along their overlapped longitudinal edges to form a single large sheet and this large sheet is then conveyed to a heating and vacuum forming station. In the present embodiment of the invention, there are two welding stations and two vacuum forming stations. A single heating device is shiftable between the two vacuum forming stations so that the sheets are alternately heated in the vacuum forming operation. Under this arrangement, the biological discs may be continuously produced.

During the vacuum forming operation, the large sheet of plastic material is heated and vacuum formed so that a plurality of cup-like convex elements are formed throughout the surface area of the sheet. The sheet is then transferred to a cutting station where heating elements form openings in the sheet for accommodating the axle and tie rod. The sheet is also cut into circular configurations by a cutting mechanism.

Referring again to FIG. 1, it will be seen that the apparatus 10 includes a pair of welding stations 11 which are positioned in side by side relation. Each welding station includes a plurality of guide rails 12 which support the sheets S to be welded. It will be noted that the sheets S to be welded are generally rectangular shaped configurations and have their adjacent longitudinal edges LE disposed in overlapped relation. The sheets are moved in a predetermined direction so that the overlapped longitudinal edges LE engage a heating mechanism 13 which heats the longitudinal edges to a predetermined temperature to permit the edges to be heat sealed together.

The heating mechanism 13 includes a resistant type heating element 14 connected by suitable electrical conductors to a source of electrical current. The heating mechanism 13 is supported by suitable support structure 15 positioned adjacent the guide rails 12. The heating mechanism 13 also includes an upper shoe 16 spaced above the heating element 14 and a lower shoe 17 spaced below the heating element 14. The upper and lower shoes are also mounted on the support structure 15. It will be seen that when the sheets S are moved past the heating mechanism 13, the lapped adjacent longitudinal edges of these sheets engage the surfaces of the heating element. In this respect, the lower surface of one sheet edge engages the upper surface of the heating element 14 and is held thereagainst by the upper shoe 16. The upper surface to the other sheets engages and is held against the lower surface of the heating element by the lower shoe 16. Thus the adjacent longitudinal edges of the sheets S are simultaneously heated by the heating element 14 as the sheets are moved past the heating mechanism 13.

A compression unit 18 is also provided at the welding station 11 and includes a compression drive wheel 19 mounted on a suitable bracket secured to the support 15, and an idler compression wheel 20 mounted by a suitable bracket secured to a support element connected to the support structure 15. It will be noted that the compression drive wheel 19 is positioned to engage the upper surface of the overlapped edges of the sheets S while the compression idler wheel 20 engages the lower overlapped surfaces of the sheets S. It is preferred that the idler wheel 20 be spring loaded.

Suitable drive means are drivingly connected with the compression drive wheel 19 and include an endless drive chain 21 which engage a sprocket 22 secured to the axle of the compression drive wheel 19. The drive chain 21 is also trained about a sprocket 23 which is connected to the output shaft of an electric motor 24, the latter being mounted on the support structure 15. It will be seen that the compression unit 18 is positioned closely adjacent the heating mechanism 13 to cause the overlapped heated longitudinal edge portions of the sheet to be compressed and heat sealed together.

It will be noted that the guide rails 12 located downstream of the compression unit 12 are inclined downwardly and forwardly so that an inclined support 25 is defined. Thus each welded sheet WS is supported on the incline support and will be shifted by a shifting mechanism 26 to a heating and vacuum forming station 31. The shifting mechanism 26 includes a hydraulic cylinder 27 mounted on the support structure for the welding station 11 and having a piston rod 28 projecting axially therefrom. The piston rod 28 has a transverse rod 29 secured to the other end thereof, the latter having a plurality of upstanding fingers 30 secured thereto. It will therefore be seen that when the piston rod 28 is retracted from its extended position, the fingers 30 wll engage the upper transverse edge of the welded sheet WS and will move the sheet to the heating and vacuum forming station 31. The piston rod 28 will then be extended so that it is disposed in a position to engage the next welded sheet WS. In this respect, it is pointed out that the fingers 30 project only slightly above the upper surface of the guide rails 12 and are positioned between adjacent guide rails for engagement with the sheets WS.

In the embodiment shown, there are two heating and vacuum forming stations 31 as best seen in FIG. 1 and each station includes a vacuum forming device comprising a support frame 32 including vertical legs 33 having transverse foot elements 34 projecting angularly therefrom as best seen in FIG. 4.

The support frame 32 supports a vacuum bed or base plate 35 which is shown as of generally rectangular configuration and which has a vacuum shaping structure 36 positioned thereon as best seen in FIGS. 1 and 4. The vacuum shaping structure 36 has a plurality of convex elements projecting upwardly therefrom with downwardly opening concave recesses 38 between adjacent convex elements 37. The bed 35 has a plurality of vacuum ports 39 therein which are connected by suitable means to a manifold 40, the latter being connected to a vacuum pump 41.

Means are provided for clamping the peripheral portions of the sheet WS upon the vacuum shaping structure 36 and this means includes a clamping mechanism 42 as best seen in FIG. 4. The clamping mechanism 42 includes a plurality of clamping plates 43 each extending along one edge portion of the base plate 35. Each clamping plate 43 is of elongate flat construction and is provided with mitered ends (not shown) and each has a plurality of depending ears 44 which are each pivoted by a pivot 45 to one of a plurality of flanges 46 which are secured to the periphery of the base plate 45. Each of the clamping plates 43 has a plurality of ears 47 secured thereto and projecting outwardly therefrom and each ear is pivoted by a pivot 48 to the outer end portion of a piston rod 50 which is extensible and retractable relative to its associated hydraulic cylinder 49. The lower end of each hydraulic cylinder 49 is pivotally connected by a pivot 51 to an ear 52 secured to the upturned transverse foot element 34. Each clamping plate will have several hydraulic cylinders 49 operatively associated therewith and each is connected to a source of hydraulic fluid. The cylinders for each clamping plate will operate simultaneously to shift the clamping plate between a clamping position, as illustrated in FIG. 4, and an unclamped position wherein the clamping plate is swung upwardly and outwardly. When the clamping plate 43 is shifted to the clamping positions, the welded sheet WS will be clamped in sealing relation upon the vacuum molding structure 36.

The resistance heating device 54 is mounted on the support structure 55, the latter including vertical supports 56, transverse guide rails 57 which are connected to the vertical supports, and longitudinal support or frame elements 58 which are connected to the transverse rails 56. The heating device 54 is mounted on the transverse guide rails 57 and is longitudinally shiftable above one of the two vacuum forming devices. A garage type drive mechanism 59 of well known construction is connected to the heating device 54 and is operable to reciprocate the heating device between the two vacuum forming devices.

It will be noted that when the heating device 54 is positioned to heat the plastic sheets WS which is clamped to one of the vacuum shaping structures 36, the heating device will be positioned above but in relatively close proximity to the plastic sheet. The heating device will heat the plastic sheet to the preferred temperature and a vacuum or negative pressure will then be created in the volumetric space located between the plastic sheet and the upper surface of the base plate 35. The portions of the sheet located between the convex elements will be urged downwardly to form a plurality of cup-like elements C throughout the surface of the sheets.

Each heating and vacuum forming station is also provided with a cooling system which, in the embodiment shown, includes a plurality of cooling fans 60 for the respective vacuum forming devices. The cooling fans are mounted by suitable brackets on the associated longitudinal frame elements 58 and will be activated when the heating device 54 has been shifted to the other vacuum forming device. These fans will direct cool air against the surface of the formed heat WS to thereby cool the sheets.

The sheet is next moved to the cutting station 61 which includes a circular frame 62 comprised of circular frame elements 63 interconnected to transverse frame elements 64. The circular frame elements are also interconnected together. The circular frame elements are supported by suitable vertical support elements to space the circular frame above the surface of the floor.

A support frame 65 is positioned above and extends transversely of the circular frame 62. The support frame 65 is provided with vertical frame members or legs 66 which extend downwardly and are positioned outwardly of the circular frame 62. A hydraulic cylinder 67 is secured to the central portion of the support frame 65 and depends downwardly therefrom. The piston rod 68 of the hydraulic cylinder projects downwardly and is connected to a pressure plate 69 which is of generally rectangular configuration.

An electric motor-driven power saw device 70 is secured to one end of a support arm 71, the support arm also being fixedly connected to the pressure plate 69, as best seen in FIGS. 1, 5 and 6. The other end of the support arm 71 is provided with a counterweight 72. The power saw device 70 is provided with a switch 74 for operating the motor associated therewith, the latter being connected by suitable electrical conductors 75 to a source of electrical current. The support arm 71 actually defines a radius of predetermined magnitude so that when the saw is energized and the arm is moved to rotate about its axis, the saw will cut the sheet into circular configuration.

A centrally located annular heating mechanism 76 is also mounted on the circular frame 62 and has an upwardly facing annular sharpened edge 77. A resistance heating element is embedded in the annular heating mechanism 76 and is connected by suitable electrical conductors to a source of electrical current. The circular frame 62 also has a plurality of additional elongate vertically oriented heating rods 80 each being an electrical resistance type connected by suitable conductors to a source of electrical current. In the embodiment shown, these heating rods 80 include two sets, each set including four rods which are spaced outwardly of the heating mechanism 76. It will be noted that one set is positioned closely adjacent the heating mechanism 76 while the other set is positioned substantially outwardly of the first set of heating rods 80.

During operation of the components at the cutting station 21, the sheet WS will be positioned upon the circular frame 62 and the heating rod and the heating mechanism 76 will be energized. The piston rod 68 which is then in the retracted position will be extended so that the pressure plate 69 will urge the plate downwardly against the heating mechanism 76. The heating mechanism 76 will melt through the plastic to form an opening therein while the remaining portion of the sheet will be forced downwardly by action of gravity upon the heating rods 80 thus forming openings therein. A bead B will be formed along the periphery of the opening O which is made by the heating mechanism 76, and a bead B will also be formed around the periphery of the openings T formed by the heating rods 80. The opening O in the disc D will receive the axle therethrough while the openings T will receive the tie rods therethrough. It is therefore desirable to form a bead around the periphery of these openings to minimize failure at these stress locations.

The saw 70 will then be operated so that the sheet WS will be cut into the circular disc D. A group of discs will then be assembled on an axle and secured in place by suitable tie rods which extend through openings T in the discs.

From the foregoing description, it will be seen that I have provided a novel apparatus or method for continuously making large biological discs.

It will therefore be seen that the novel method and apparatus described hereinabove uses components arranged in a relatively uncomplex manner and therefore permits the disc to be continuously made and in a more efficient manner than any heretofore known comparable method.

What is claimed is:

1. Apparatus for forming a circular water-treatment biological disc comprising:
   a support means for supporting a pair of substantially identical, rectangular flat plastic sheets of material in side by side relation, the rectangular sheets having adjacent longitudinal edges thereof disposed in overlapped relation,
   a heating mechanism engageable with the adjacent overlapped longitudinal edges of the pair of plastic sheets to simultaneously heat the longitudinal edges to a predetermined temperature,
   a compression assembly for compressing the overlapped heated longitudinal edges of the sheets to thereby heat seal the edge portion together and form the two sheets into a single large sheet,
   a vacuum forming device including a horizontally disposed vacuum forming structure, having a plurality of upwardly convex elements and a plurality of downwardly opening concave recesses throughout the area of said vacuum forming structure, clamping means connected with the peripheral portions of said vacuum forming structure and being operable to releasably clamp the peripheral portions of the sheets on the vacuum forming structure,
   a volumetric vacuum zone defined between the clamped sheet and the vacuum forming structure when the former is clamped to the latter, means connected with a vacuum zone for evacuating air therefrom,
   a heating mechanism shiftable into close proximity of the vacuum forming device for heating the sheet when the latter is clamped upon the vacuum forming structure,
   a cutting apparatus positioned closely adjacent the vacuum forming device including a supporting frame, and a cutting mechanism mounted adjacent said frame and adapted to be rotated on a predetermined radius for cutting the sheet into a disc form.

2. The apparatus as defined in claim 1 and a conveyor mechanism on said support means for conveying a single large sheet to said vacuum forming structure.

3. The apparatus as defined in claim 1 and heating means on said supporting frame adapted to engage the sheet when the latter is positioned upon the frame to form openings therein.

4. The apparatus as defined in claim 3 wherein said heating means includes an annular heating device mounted on said frame, a pressure applying mechanism mounted adjacent to said frame and being shiftable towards and away from said annular heating device, said pressure applying mechanism engaging sheet positioned on said frame to urge the sheet against said annular heating device to thereby form a central opening in said sheet.

* * * * *